United States Patent [19]

Grubisic et al.

[11] Patent Number: 4,842,338
[45] Date of Patent: Jun. 27, 1989

[54] WHEEL FOR A COMMERCIAL VEHICLE

[76] Inventors: Vatroslav Grubisic, Zum Stetteritz 1, 6107 Reinheim 4; Gerhard Fischer, Menzelweg 6, 6100 Darmstadt, both of Fed. Rep. of Germany

[21] Appl. No.: 445,253

[22] Filed: Nov. 29, 1982

[30] Foreign Application Priority Data

Dec. 3, 1981 [DE] Fed. Rep. of Germany ....... 3147820

[51] Int. Cl.⁴ .............................................. B60B 1/00
[52] U.S. Cl. ................................ 301/9 DN; 301/63 R
[58] Field of Search .......... 411/531; 301/9 DN, 37 R, 301/37 S, 63 C, 63 PW, 63 R

[56] References Cited

U.S. PATENT DOCUMENTS

| 2,432,530 | 12/1947 | Lyon | 301/37 S |
| 2,439,881 | 4/1948 | Ash | 301/65 |
| 3,166,357 | 1/1965 | Vachon et al. | 301/9 DN |

FOREIGN PATENT DOCUMENTS

| 1272053 | 7/1968 | Fed. Rep. of Germany | 301/9 DN |
| 2308925 | 9/1973 | Fed. Rep. of Germany | 301/9 DN |
| 55-91401 | 7/1980 | Japan | 301/65 |
| 2102744 | 2/1983 | United Kingdom | 301/63 PW |

OTHER PUBLICATIONS

International, Bulletin No. SM-4, 1969.

*Primary Examiner*—Johnny D. Cherry
*Assistant Examiner*—Russell D. Stormer
*Attorney, Agent, or Firm*—Horst M. Kapser

[57] ABSTRACT

A wheel is provided for a commercial vehicle which comprises a wheel disc having bolt holes in the region of the wheel mounting face for attaching the wheel disc to a wheel hub flange or to a brake drum by way of wheel bolts and intermediate disks surrounding the bolt holes directly and concentrically and which by themselves provide a support surface between wheel mounting face, wheel hub flange or, respectively, brake drum or dual wheel. The intermediate disks allow to avoid fretting corrosion in the support region of the wheel disc, stiffening of the wheel disc central region, avoiding of surface damage, and improvement of the bolting. The intermediate disks can be solidly attached to the wheel disc by way of adhesive disposed in between, by friction setting, or by casting.

20 Claims, 2 Drawing Sheets

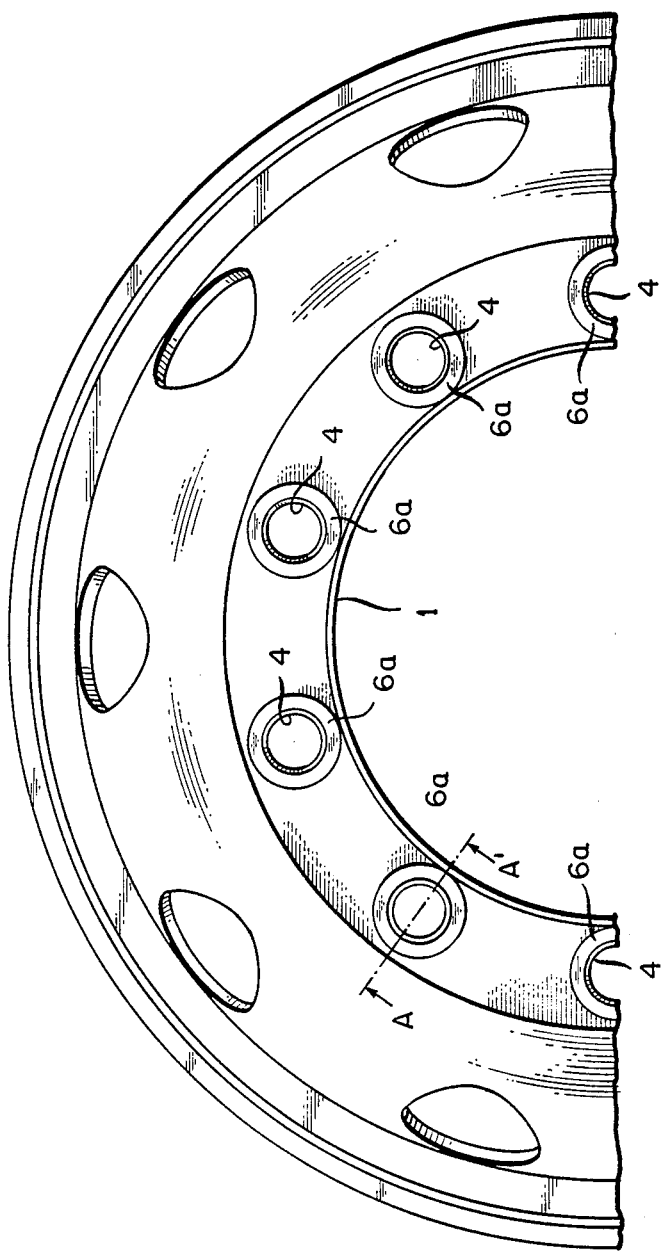
FIG. 1  CONCENTRIC INTERMEDIATE DISKS

INTERMEDIATE DISKS AT THE CIRCUMFERENCE
OF THE WHEEL MIRROR

WHEEL FOR A COMMERCIAL VEHICLE

BACKGROUND OF THE INVENTION

1. Field of the Invention

The present invention relates to a wheel disc of commercial vehicle wheels having bolt holes in the region of the wheel mouting face for receiving wheel bolts, which serve to attach the wheel to the wheel hub flange or to a brake drum.

2. Brief Description of the Background of the Invention Including Prior Art

The minimum wall thickness of the wheel disc in the contact area of the mounting face of wheel to flange is determined in the context of commercial vehicles, in particular of those with light alloy or light metal wheels, by the fretting corrosion occurring there, which causes a considerable decrease of the fatigue strength. If it would be possible to avoid fretting corrosion, then the wall thickness could be decreased considerably and thereby material requirements and weight could be lowered. This is of particular importance for light alloy or light metal wheels, which require in comparison with steel wheels nearly twice the wall thickness in the area of the wheel mounting face. A special bolting is required based on this situation in many types of trucks, in particular in the case of twin wheels and further a change of the track dimensions is effected.

SUMMARY OF THE INVENTION

1. Purposes of the Invention

It is an object of the present invention to avoid or diminish the influence of fretting corrosion in the region of the bolting by simple means which in particular do not require additional operational steps in the production of the wheels to improve the fatigue behaviour of contact surface.

It is another object of the present invention to provide for stiffening of the wheel of the center section and to improve the behaviour of the wheel bolting to the support structure.

These and other objects and advantages of the present invention will become evident from the description which follows.

2. Brief Description of the Invention

The present invention provides a wheel for a commercial vehicle which comprises a wheel disc having bolt holes in the region of the wheel mounting face for attaching the wheel to a wheel hub flange or to a brake drum by way of wheel bolts, and intermediate disks surrounding the bolt holes directly and concentrically and which by themselves provide a support surface between wheel support means and wheel mounting face. The wheel support means can be provided by a wheel hub flange, by a brake drum, or by a dual wheels. The intermediate disks can be attached adhesively, by way of a friction setting or can be cast into the wheel. The intermediate disks can be provided for each bolt in the support region of the wheel bolt heads or by an annular disk around the hub of the wheel in the support region of the wheel bolt nuts.

There is also provided a method for attaching a wheel to a commercial vehicle by way of bolts passing through bolt holes which comprises attaching intermediate disks to the wheel disc for surrounding the bolt holes directly and concentrically and which intermediate disks by themselves provide a support surface between wheel mounting face, wheel hub flange or, respectively, brake drum or dual wheels, and bolting the wheel to a support structure disposed on the commercial vehicle.

There is also provided a method for avoiding and/or decreasing fretting corrosion between the wheel of a commercial vehicle and its support structure which comprises disposing an intermediate disk between the wheel disc and the support structure and then bolting the wheel to the support structure.

Thus the intermediate disks are solidly connected to the wheel disc and surround the bolt holes immediately and concentrically or via the circumference of the wheel mounting face and which intermediate disks by themselves form the support surface between the wheel mounting face and the wheel hub flange or, respectively, the brake drum. The intermediate disks can be connected to the wheel disc in a simple fashion such as by way of gluing, friction setting or by casting into the wheel. It is particularly advantageous to employ like intermediate disks also in the contact area of the wheel bolt heads or of the wheel bolt nuts.

Upon employing of the intermediate disks applied to the two sides at the wheel mounting faces in the circumferential direction, an additional stiffening effect of the relatively low strength base material of light alloy or light metal wheel is observed in addition to the avoidance of fretting corrosion, if the intermediate disks comprise a higher strength material such as for example steel. According to the composite construction, part of the flow of force, in particular at the wheel central region highly stressed with respect to bending, is fed from the intermediate disks disposed at the outside and held together by wheel bolts or respectively adhesive connections, such that an unloading of the lower strength basic material is present.

In addition, the material indentation and surface damage under the wheel nuts caused by the large contact pressure is completely avoided with the aid of intermediate disks disposed at the light alloy or light metal wheel, which material indentation and surface damage can result during operation in a loss of the bolting force or in a fracture of the wheel or of the wheel bolts. Upon use of adhesively attached intermediate discs further a more advantageous spring effect can be achieved, which renders the bolt connection less sensitive to a loss of the bolting force torque.

The wall thickness in the bolting region of light alloy or metal wheels for trucks can be decreased clearly based on the advantageous effects of the intermediate disk which include Avoiding of Fretting Corrosion Stiffening of the Wheel Mounting Face based on Composite Construction Avoidance of Material Indentations under the Wheel Bolts in the Base Material Associated with Loss of the Bolting Force Improvement of the Tensioning in the Bolting Region.

This results not only in advantage of saving materials and excess weight, but also in a better structural and material quality (less inclusions, less blowholes and the like) due to lower thickness in this area.

The novel features which are considered as characteristic for the invention are set forth in particular in the appended claims. The invention itself, however, both as to its construction and its method of operation, together wtih additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention, FIG. 1 is a schematic view of a wheel with concentric intermediate disks;

DESCRIPTION OF INVENTION AND PREFERRED EMBODIMENTS

Figure 3:
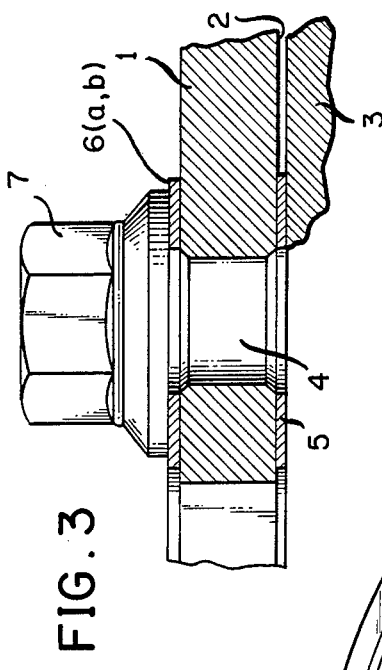
FIG. 3 is an in part sectional view of FIG. 1 along section line A—A'.
Figure 2:
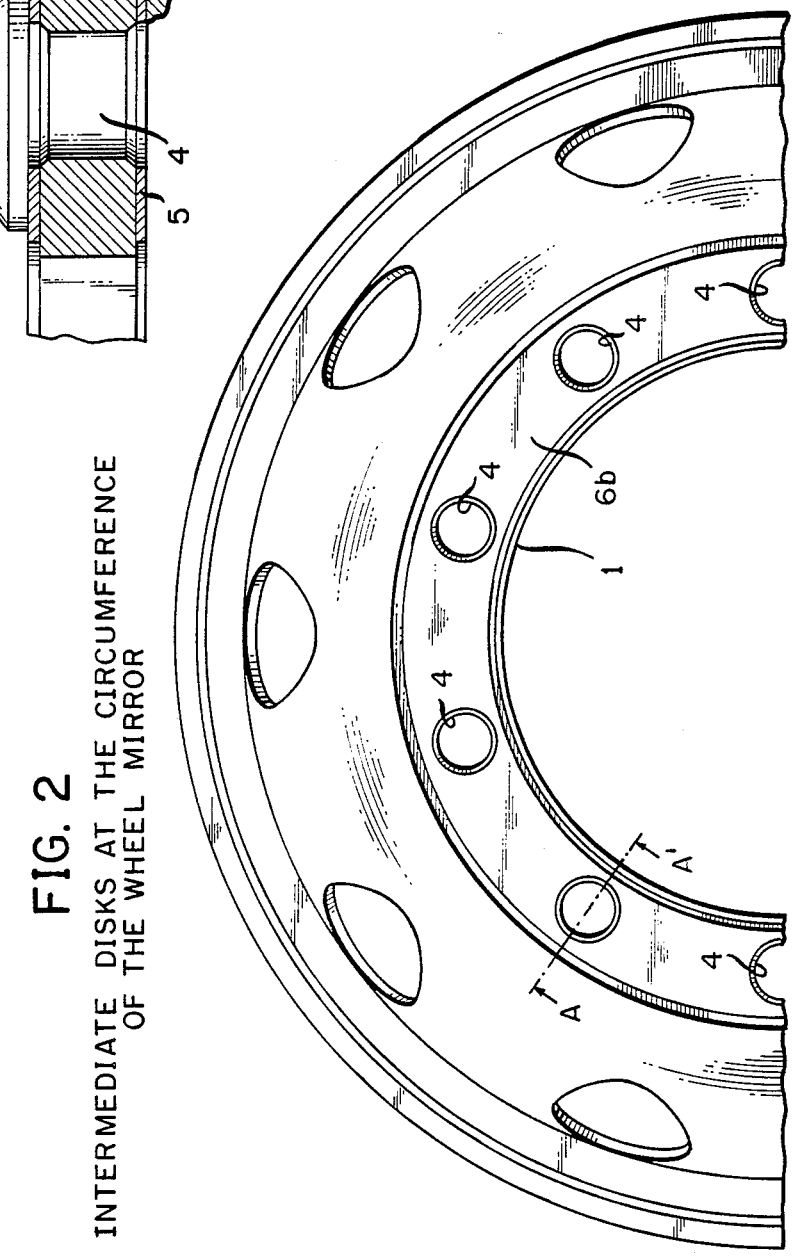
FIG. 2 is a schematic view of a wheel with intermediate disks at the circumference of the wheel mirror.

In accordance with the present invention there is provided a wheel disc of a commercial vehicle with bolt holes in the wheel central region, which serve for receiving the wheel disc at a wheel hub flange or a a brake drum by way of wheel bolts. Intermediate disks 5 solidly connected to the wheel disc 1 and surrounding the bolt holes 4 immediately, concentrically 6a or in circumferential direction 6b and which alone form a support surface between wheel mounting face 2, wheel hub flange or, respectively, brake drum 3 or dual wheels.

The intermediate disks can be adhesively attached to the wheel disc, they can be friction set into the wheel, or they can be cast into the wheel. Like intermediate disks 6, 6a, 6b can be provided in the support region of the wheel bolt heads or of the wheel bolt nuts 7.

Referring now to FIG. 1 there is shown as a section a part of a wheel disc 1 with wheel mounting face 2 and with a bolt hole 4. A corresponding part of a wheel hub flange or, respectively, of a brake drum is indicated at 3, to which the wheel disc is to be attached by way of a wheel bolt indicated through a wheel nut 7.

An intermediate disk 5 solidly connected to the wheel disc 1 is provided in the support region of the wheel mounting face and the intermediate disk 5 surrounds the bolt hole 4 directly concentric 6a or via the circumference of the wheel mirror 6b. The complete sum of such intermediate disks 5 surrounding the bolt holes forms the sole support surface between the wheel mounting face 2, and the wheel hub flange or, respectively, the brake drum 3 or the dual wheels.

By way of a disc 6 like the intermediate disk and also solidly connected to the wheel disc 1 the appearance of fretting corrosion is suppressed in the support region of the wheel nut 7 or of a corresponding wheel bolt.

It will be understood that each of the elements described above, or two or more together, may also find a useful application in other types of wheel system configurations and wheel mounting procedures differing from the types described above.

While the invention has been illustrated and described in the context of a wheel for a commercial vehicle employing intermediate disks for attachment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A wheel for a commerical vehicle comprising
    a wheel disc having bolt holes in the region of the wheel mounting face for attaching the wheel disc to wheel support means by way of wheel bolts; and
    intermediate discs for covering an area of the bolt holes in the wheel for attachment bolts, which intermediate discs are attached to the wheel disc on the two opposite sides of the wheel disc, which intermediate discs have a hole for each bolt with the hole surrounding the bolt holes directly and concentrically and which intermediate discs disposed between wheel and support means provide a support surface between support means and wheel mounting face.

2. The wheel for a commerical vehicle according to claim 1 wherein the wheel support means is provided by a wheel hub flange.

3. The wheel for a commercial vehicle according to claim 1 wherein the wheel support means is provided by a brake drum.

4. The wheel for a commercial vehicle according to claim 1 wherein the wheel support means is provided by a dual wheel.

5. The wheel for a commercial vehicle according to claim 1 wherein the intermediate discs are adhesively attached to the wheel disc.

6. The wheel for a commercial vehicle according to claim 1 wherein the intermediate discs are friction set into the wheel disc.

7. The wheel for a commercial vehicle according to claim 1 wherein the intermediate discs are cast into the wheel disc.

8. The wheel for a commercial vehicle according to claim 1 wherein uniform intermediate discs are provided for each bolt in the support region of the wheel bolt heads.

9. The wheel for a commercial vehicle according to claim 1 wherein uniform intermediate discs are provided by a ring having a hole for each bolt hole of the wheel, which ring is attached to the wheel around the hub of the wheel in the support region of the wheel bolt nuts.

10. A method for attaching a wheel to a commercial vehicle by way of bolts and bolt holes comprising
    attaching intermediate discs for covering an area of the boles of a wheel disc for attachment bolts to the wheel disc on two opposite sides of the wheel disc and the intermediate discs having a hole for each bolt for surrounding the bolt directly and concentrically and which intermediate discs by themselves provide a support surface between wheel mounting face, wheel hub flange or, respectively, brake drum or dual wheels, and
    bolting the wheel to a support structure disposed on the commercial vehicle.

11. The method for attaching a wheel to a commercial vehicle according to claim 10 wherein the intermediate discs are adhesively attached to the wheel disc.

12. The method for attaching a wheel to a commercial vehicle according to claim 10 wherein the intermediate discs are friction set into the wheel disc.

13. The method for attaching a wheel to a commercial vehicle according to claim 10 wherein the intermediate discs are cast into the wheel disc.

14. A method for avoiding fretting corrosion between the wheel of a commercial vehicle and its support structure comprising
   attaching an intermediate disc at a wheel disk on the side corresponding to heads of bolts for covering an area of bolt holes in the wheel disc and the intermediate discs having a hole for each bolt;
   attaching an intermediate disc at the wheel disc on the side of the support structure for covering the area of the bolt holes in the wheel disc and the intermediate discs having a hole for each bolt; and
   bolting the wheel to the support structure.

15. The method for avoiding fretting corrosion according to claim 14 wherein the intermediate disc is adhesively attached to the wheel.

16. The method for avoiding fretting corrosion according to claim 14 wherein the intermediate discs are friction set into the wheel disc.

17. The method for avoiding fretting corrosion according to claim 14 wherein the intermediate discs are cast into the wheel disc.

18. The method for avoiding fretting corrosion according to claim 14 wherein the structural support is provided by a wheel hub flange.

19. The method for avoiding fretting corrosion according to claim 14 wherein the structural support is provided by a brake drum.

20. The method for avoiding fretting corrosion according to claim 14 wherein the structural support is provided by a dual wheel.

* * * * *